Patented Sept. 11, 1934

1,973,662

UNITED STATES PATENT OFFICE 1,973,662

PROCESS FOR REACTING OLEFINS WITH CARBON MONOXIDE

Jacques Schalch, Chicago, Ill., assignor to Van Schaack Bros. Chemical Works, Inc., Chicago, Ill., a corporation of Illinois No Drawing. Application January 2, 1931, Serial No. 506,300

13 Claims. (Cl. 260—156)

This invention relates to a process of producing derivatives of unsaturated hydrocarbons, particularly derivatives containing oxygen, and, more particularly, compounds resulting from the reaction of carbon monoxide with olefins and other unsaturated hydrocarbons.

Methods of practising my invention are illustrated in the following specific examples.

Example 1

A fraction of vapor-phase cracked petroleum containing substantial proportions of butylenes and amylenes is placed in liquid form in an autoclave with approximately half as much by weight of nickel carbonyl. The autoclave is then closed and the mixture is made intimate and then warmed.

The temperature of warming is such as to decompose nickel carbonyl reversibly into nickel and carbon monoxide and to permit of a combination of the active carbon monoxide with the olefins in the petroleum fraction, in the presence of finely divided nickel resulting from the decomposition of the carbonyl.

The temperature should be in excess of atmospheric, preferably between 80 and 200° C., say, approximately 130° C.

After being heated for several hours, the autoclave is cooled, preferably, to below the boiling point of either ingredient used, carefully opened, and the products fractionated. The material boiling above the highest boiling substance present in substantial amount in the raw materials used is accepted as synthesized in the process.

The temperature at which the synthetic material is separated, by fractionation, from the raw materials will depend upon the boiling range of the petroleum product used. Thus, if I have used a vapor-phase cracked petroleum product consisting largely of the isomeric butylenes and amylenes and boiling between −10° and 45° C., I collect the first of the synthetic product at a temperature above 45° C., suitably at a temperature above 55° C.

Example 2

The process is performed as under Example 1, except that there is present during the pressure digestion one or more of the following catalysts: oxide of zinc, iron, molybdenum, uranium, silica (in the form of silica gel), aluminum (in the partially dehydrated form suitable for dehydrating alcohol), thorium, or cerium; cuprous chloride; finely divided platinum, palladium or iron, or nickel (prepared from one of its salts).

Example 3

Carbon monoxide in excess is bubbled through a liquefied petroleum fraction, rich in butylenes and amylenes, in the presence of one or more of the catalysts disclosed in Example 2, at a temperature of 80° to 200° C., suitably about 130° C. under sufficient pressure to maintain a liquid phase of the petroleum fraction. Vigorous agitation is preferably used. The unabsorbed gas is allowed to pass out of the autoclave.

After the completion of the passage of the carbon monoxide through the petroleum fraction, the autoclave is cooled and carefully opened.

The products are then separated by fractionation, as described under Example 1.

Example 4

The process of Examples 1, 2, or 3 is used, except that the olefin-rich petroleum fraction that is used has a boiling range of about 75° to 150° C. and that the treatment with carbon monoxide or nickel carbonyl is made at a temperature 50° to 150° C. higher than formerly described.

Example 5

The process of Examples 1 to 4 is followed except that the reaction is made to occur in the vapor or gas phase, under conditions of relatively high temperature and pressure. The catalyst, suitably in granular form or supported on a substance of relatively large surface area, such as pumice, active carbon or asbestos, is placed in a container, such as a heated tube, through which an intimate, highly compressed mixture comprising olefin, carbon monoxide and/or a carbonyl of nickel or iron is passed. The temperature of the catalyst chamber is above the critical temperature of the hydrocarbons used and below red heat, say, between approximately 250° and 350° C. The pressure is preferably as high as the equipment will withstand safely, say above 10 atmospheres, suitably above 100 atmospheres, as, for example, 400 atmospheres.

While the above Examples 1 to 5, describe the process as applied to making derivatives of olefins, I may use other unsaturated hydrocarbons, as, for example, acetylenes or hydrocarbons containing more than one double bond, such as dienes or polyenes. Thus, I may substitute butadiene for the hydrocarbon material used in Examples 1, 2, 3, and 5. Also, I may use in any of the examples a vapor-phase cracked petroleum that contains both olefins and dienes, such as the products from the "gyro" vapor-phase cracking process, in which the cracking is done at about 550° C.

These products contain also substantial amounts of highly reactive olefins of branch chain structure, such as isobutene or an isopentene.

The catalyst used may well be a substance that tends to associate closely with both the unsaturated hydrocarbon and the carbon monoxide. Thus cuprous chloride is said to form unstable compounds with either. Again, finely divided nickel or iron absorbs one and combines reversibly with the other. The amount of catalyst used may well be one-tenth to five per cent of the weight of hydrocarbon used.

The catalyst may be omitted from the reaction if one is not concerned with yield or rate of reaction.

The mixture of oxygen containing products produced by my process may be used in pyroxylin or resin compositions, as a diluent or solvent.

Iron carbonyl may be used in place of nickel carbonyl as a raw material or catalyst in my process.

Steam or water may be introduced into the reaction mixture comprising an unsaturated hydrocarbon, carbon monoxide, and/or a carbonyl. The proportion of steam or water used is suitably not less than 10%, say 30 to 70%, of the weight of the hydrocarbon.

By the term "metal catalyst" as used in the specifications or claims, I mean a catalytically active form or compound of the metal. The "metal catalyst" may comprise free metal and/or an oxide of that metal or another metal, either as a coating over the metal or admixture therewith. Examples of a "metal catalyst" are (a) finely divided iron; (b) finely divided nickel; (c) zinc oxide; (d) zinc oxide and nickel; (e) vanadium oxide and a metal, as, for example, iron, nickel, or zinc, the whole being suitably in finely divided or porous form.

I claim:

1. The process of reacting an aliphatic hydrocarbon containing a double bond with carbon monoxide which comprises bringing a mixture of the substances at elevated temperature, and at a pressure sufficient to maintain a liquid phase, into contact with finely divided nickel.

2. The process of reacting an aliphatic hydrocarbon containing a double bond with carbon monoxide which comprises bringing a mixture of the substances at elevated temperature, and at a pressure sufficient to maintain a liquid phase, into contact with finely divided nickel and cuprous chloride.

3. The process of treating an unsaturated aliphatic hydrocarbon with carbon monoxide, in the presence of nickel catalyst and a dissociable metal carbonyl at a temperature above 200° C. and below red heat and a pressure above 10 atmospheres.

4. The process of treating an unsaturated aliphatic hydrocarbon with carbon monoxide, in the presence of nickel catalyst, at a temperature above 250° C. and below 350° C. and a pressure above 10 atmospheres.

5. The process of treating an unsaturated aliphatic hydrocarbon with carbon monoxide, in the presence of nickel catalyst, at a temperature above 250° C. and below 350° C. and a pressure of approximately 400 atmospheres.

6. A process of reacting an olefin with a substantial amount of carbon monoxide which comprises bringing a mixture of the substances at superatmospheric temperature and pressure sufficient to maintain a liquid phase, and in the absence of substantial amounts of hydrogen, into contact with at least one catalyst of the group consisting of: finely divided iron, finely divided nickel, zinc oxide, zinc oxide and nickel, vanadium oxide, cuprous chloride, iron oxide, aluminum oxide, molybdenum oxide, silica gel, thorium oxide, cerium oxide, uranium oxide, platinum, palladium, nickel carbonyl, iron carbonyl.

7. A process of reacting an olefin with carbon monoxide which comprises bringing a mixture of the substances at superatmospheric temperature and pressure sufficient to maintain a liquid phase, and in the absence of substantial amounts of hydrogen, into contact with a dissociable metal carbonyl and at least one catalyst of the group consisting of: finely divided iron, finely divided nickel, zinc oxide, zinc oxide and nickel, vanadium oxide, cuprous chloride, iron oxide, aluminum oxide, molybdenum oxide, silica gel, thorium oxide, cerium oxide, uranium oxide, platinum, palladium.

8. A process of reacting an olefin with carbon monoxide which comprises bringing a mixture of the substances substantially free from hydrogen at a temperature above 250° C. and below red heat into contact with a dissociable metal carbonyl and at least one catalyst of the group consisting of: finely divided iron, finely divided nickel, zinc oxide, zinc oxide and nickel, vanadium oxide, cuprous chloride, iron oxide, aluminum oxide, molybdenum oxide, silica gel, thorium oxide, cerium oxide, uranium oxide, platinum, palladium.

9. A process of reacting an olefin with carbon monoxide which comprises bringing a mixture of the substances substantially free from hydrogen at a temperature above 250° C. and below 350° C. into contact with at least one catalyst of the group consisting of: finely divided iron, finely divided nickel, zinc oxide, zinc oxide and nickel, vanadium oxide, cuprous chloride, iron oxide, aluminum oxide, molybdenum oxide, silica gel, thorium oxide, cerium oxide, uranium oxide, platinum, palladium, nickel carbonyl, iron carbonyl.

10. A process of reacting an olefin with carbon monoxide which comprises bringing a mixture of the substances into contact with a finely divided nickel catalyst at a temperature above 250° C. and below 350° C.

11. A process of treating an unsaturated aliphatic hydrocarbon with carbon monoxide which comprises bringing a mixture of the substances substantially free from hydrogen at a temperature above 100° C. and below red heat at a pressure above 10 atmospheres into the presence of at least one catalyst of the group consisting of: finely divided iron, finely divided nickel, zinc oxide, zinc oxide and nickel, vanadium oxide, cuprous chloride, iron oxide, aluminum oxide, molybdenum oxide, silica gel, thorium oxide, cerium oxide, uranium oxide, platinum, palladium, nickel carbonyl, iron carbonyl.

12. A process of treating an unsaturated aliphatic hydrocarbon with carbon monoxide which comprises bringing a mixture of the substances substantially free from hydrogen at a temperature above 200° C. and below red heat at a pressure above 10 atmospheres into the presence of at least one catalyst of the group consisting of: finely divided iron, finely divided nickel, zinc oxide, zinc oxide and nickel, vanadium oxide, cuprous chlorde, iron oxide, aluminum oxide, molybdenum oxide, silica gel, thorium oxide, cerium oxide, uranium oxide, platinum, palladium, nickel carbonyl, iron carbonyl.

13. A process of reacting an unsaturated aliphatic hydrocarbon with carbon monoxide which comprises bringing the substances substantially free from hydrogen at a pressure above 10 atmospheres and a temperature above 200° C. in the presence of steam into contact with at least one catalyst of the group consisting of: finely divided iron, finely divided nickel, zinc oxide, zinc oxide and nickel, vanadium oxide, cuprous chloride, iron oxide, aluminum oxide, molybdenum oxide, silica gel, thorium oxide, cerium oxide, uranium oxide, platinum, palladium, nickel carbonyl, iron carbonyl.

JACQUES SCHALCH.